United States Patent
Kobayashi et al.

[11] Patent Number: 5,959,832
[45] Date of Patent: Sep. 28, 1999

[54] SOLID ELECTROLYTIC CAPACITOR WITH HEAT RESISTING POLYANILINE AND METHOD OF MANUFACTURING SAME

[75] Inventors: Atsushi Kobayashi; Takashi Fukaumi; Kosuke Amano; Hitoshi Ishikawa; Masaharu Satoh, all of Tokyo, Japan

[73] Assignee: NEC Corporation, Tokyo, Japan

[21] Appl. No.: 08/808,679

[22] Filed: Feb. 28, 1997

Related U.S. Application Data

[63] Continuation of application No. 08/562,448, Nov. 24, 1995.

[51] Int. Cl.$^6$ ...................................................... H01G 9/02
[52] U.S. Cl. ........................... 361/525; 361/523; 361/524; 29/25.03
[58] Field of Search ..................................... 361/525, 323, 361/523, 524, 526, 527; 29/25.03; 252/500, 162.2

[56] References Cited

U.S. PATENT DOCUMENTS

| | | | |
|---|---|---|---|
| 5,130,886 | 7/1992 | Kishimoto et al. | 361/525 |
| 5,428,500 | 6/1995 | Nishiyama et al. | 361/525 |
| 5,473,503 | 12/1995 | Sakata et al. | 361/525 |

FOREIGN PATENT DOCUMENTS

| | | | |
|---|---|---|---|
| 62-29124 | 2/1987 | Japan . | |
| 258817 | 2/1990 | Japan . | |
| 2119213 | 5/1990 | Japan . | |
| 335516 | 2/1991 | Japan . | |
| 3-269018 | 11/1991 | Japan | C08G 73/00 |
| 5-3138 | 1/1993 | Japan | H01G 9/02 |
| 5-41338 | 2/1993 | Japan | H01G 9/02 |
| 6-32845 | 2/1994 | Japan | C08F 283/00 |
| 6-45195 | 2/1994 | Japan | H01G 9/02 |
| 629159 | 4/1994 | Japan . | |
| 6-252002 | 9/1994 | Japan | H01G 9/02 |
| WO 10297 | 9/1990 | WIPO . | |
| WO 5979 | 5/1991 | WIPO . | |
| WO 1694 | 2/1999 | WIPO . | |

OTHER PUBLICATIONS

Database WPI, Section Ch, Week 9410, Derwent Publications, Feb. 4, 1994.

S. Palaniappan et al., "Composition and Spectral Studies of Polyaniline Salts", Polymers for Advanced Technologies, vol. 5, No. 4, Apr. 1, 1994, 225–230.

*Primary Examiner*—Lynn D. Feild
*Assistant Examiner*—Phuong T. Vu
*Attorney, Agent, or Firm*—Sughrue, Mion, Zinn, Macpeak & Seas, PLLC

[57] ABSTRACT

A heat resistant derivative conductive polymer containing nitrogen atoms exclusively in units of polyaniline or a derivative thereof contains a sulfonic acid compound as a dopant, and the percentage of sulfonic acid groups per recurring unit of the polyaniline or derivative thereof is set to 28 to 40%. Also, a solid electrolytic capacitor uses a solid electrolyte of polyaniline or derivative thereof containing a sulfonic acid compound as a dopant, wherein the percentage of sulfonic acid groups per recurring unit of polyaniline or derivative thereof is set to 28 to 40%. In this selected range of the concentration of the dopant, the conductivity and the pyrolysis commencement temperature characteristics are excellent.

14 Claims, 2 Drawing Sheets

SOLID ELECTROLYTIC CAPACITOR WITH HEAT RESISTING POLYANILINE AND METHOD OF MANUFACTURING SAME

This is a Continuation of application Ser. No. 08/562,448 filed Nov. 24, 1995.

BACKGROUND OF THE INVENTION

(1) Field of the Invention

The present invention relates to heat resistant polyaniline or derivatives thereof and a method of manufacturing the same, and more particularly to solid electrolytic capacitors using such heat resistant polyaniline or derivatives thereof as electrolyte and a method of manufacturing the same.

(2) Description of the Related Art

A solid electrolytic capacitor usually comprises a porous member of a valve action metal, such as tantalum or aluminum, as a first electrode (anode), an oxide film formed as a dielectric film on a surface of the first electrode and a solid electrolyte formed as a part of a second electrode (cathode) on the dielectric. The solid electrolyte has a role of electrically connecting the entire surface of a dielectric film in the porous member and an electrode lead and, from this standpoint, it is preferable for the solid electrolyte to have high conductivity.

The solid electrolyte is also required to have a function of healing electrical shorts that are caused by defects in the dielectric film. This means that metals having no dielectric healing function cannot be used as solid electrolyte irrespective of their high conductivity. To this end, a metal such as manganese dioxide is used which undergoes transition to insulator by such causes as heat generation due to short-circuiting currents.

Also, since the solid electrolyte is exposed to heat of 240 to 260° C. when used as a capacitor mounted on a printed circuit board, it has been usual to use a substance (for example, manganese dioxide or the like) which has a heat resistance of at least 260° C.

Specifically, the substance serving as the solid electrolyte of a solid electrolytic capacitor should meet the following three requirements: Namely, that (a) it has high conductivity;

(b) it has a dielectric healing function; and (c) it has a heat resistance of at least 260° C.

Manganese dioxide which has been used as solid electrolyte, although having sufficient properties insofar as the dielectric healing function and heat resistance are concerned, has not always been sufficient as solid electrolyte of solid electrolytic capacitors concerning the conductivity (about 0.1 S/cm).

Recently, vigorous development of solid electrolytic capacitors is in progress, in which such conductive polymers as polypyrrole, polythiophene and polyaniline having a conductivity as high as 10 to 100 S/cm and capable of being readily formed at room temperature are used as solid electrolyte.

The conductive polymer usually has high conductivity and dielectric healing function, but is rather inferior in the heat resistance. Therefore, it has been necessary, with polypyrrole, for instance, to improve its heat resistance by using alkylbenzene sulfonic acid with alkyl group carbon numbers of 2 to 16 (Japanese Patent Application Kokai Publication No. Hei 2-119213) or aromatic sulfonic acid (Japanese Patent Application Kokai Publication No. Hei 2-58817) as its dopant.

However, even the use of such dopant does not permit sufficient heat resistance to be obtained.

In the case of using polyaniline, the obtainable capacitors as disclosed in Japanese Patent Application Kokai Publication No. Sho 62-29124 do not have sufficient capacitor characteristics because of low dopant concentration of solid electrolyte polyaniline and also as low conductivity as 0.1 S/cm and below.

There is a method of forming an electrolyte by using a soluble polyaniline solution as disclosed in Japanese Patent Application Kokai Publication No. Hei 3-35516. In this case, it is impossible to sufficiently cover a surface of enlarged dielectric film because of a high viscosity of soluble polyaniline solution, so that a capacitance of capacitor as designed cannot be obtained.

There is further a method of chemical polymerization using a selected dopant (Japanese Patent Application Kokai Publication No. Hei 6-29159). In this case, excellent high frequency characteristics and also excellent thermal stability at 125° C. are obtainable. On the demerit side, however, the characteristics are extremely reduced even in a short period of time at temperatures of 230 to 260° C. and above, and the soldering property obtainable is inferior.

SUMMARY OF THE INVENTION

An object of the invention is to develop heat resistant polyaniline and provide a solid electrolytic capacitor using such polyaniline and a method of manufacturing the same.

The inventors conducted extensive research and investigation in order to solve the problems discussed above and found that effective improvements are obtainable when the dopant concentration in polyaniline derivative is conductivity trolled to be in a specific narrow range. The invention is predicated in this finding.

According to the invention, polyaniline or derivative thereof contains a sulfonic acid compound as a dopant in a dopant concentration (i.e., percentage of dopant per recurring unit of polyaniline) of 28 to 40%, and a solid electrolytic capacitor using this polyaniline or derivative thereof as solid electrolyte.

In the specification, by the statement that "the percentage of sulfonic acid groups per recurring unit of polyaniline or derivative thereof is 28 to 40%" is meant that 28 to 40 sulfonic acid groups of the sulfonic acid compound are contained in 100 recurring units of polyaniline or derivative thereof.

According to the invention, polyaniline or derivative thereof may be, in addition to polyaniline per se, or as polyaniline derivative, polyaniline, poly(N-methylaniline), poly(2-methylaniline), poly(3-methylaniline), poly(2-nitroaniline) and poly(3-nitroaniline).

According to the invention, there is further provided heat resistant polyaniline or derivative thereof, the sulfonic acid group percentage of which per recurring unit of polyaniline derivative is adjusted to 28 to 40% by dipping polyaniline derivative in a sulfonic acid compound solution of 0.01 to 0.5 N, or a method of manufacturing a solid electrolytic capacitor using such heat resistant polyaniline.

As the dopant of polyaniline or derivative thereof according to the invention, a sulfonic acid compound, suitably sulfonic acid, is used. Examples of this dopant are such alkylsulfonic acid derivatives as ethane sulfonic acid, butane sulfonic acid and hexane sulfonic acid, such aromatic sulfonic acids as alkylbenzene sulfonic acid and alkylnaphthalene sulfonic acid and derivatives of these acids.

Polyaniline or derivative thereof according to the invention may be used by using any oxidizer. However, it is preferable to use an oxidizer, in which the pKa value of by-product produced with its reduction in an oxidizing reaction of aniline is above the pKa value of the sulfonic acid compound. Examples of such oxidizer are potassium dichromate, sodium dichromate, ammonium dichromate, hydrogen peroxide, potassium manganate, sodium manganate, ammonium manganate, ferric sulfonate, cupric sulfonate, and lead oxide.

The valve action metal according to the invention may be tantalum, aluminum, niobium, titanium, zirconium, magnesium, silicon, etc., and it may be used in the form of rolled foil, sintered fine powder, etched rolled foil, etc.

In the manufacture of the solid electrolytic capacitor according to the invention, the conductive polymer may be formed by any suitable method.

In one method of formation, a mixed solution of a monomer, an oxidizer and a sulfonic acid compound solution having been cooled down to the reaction commencement temperature or below, is introduced into a porous body of the valve action metal on which a surface oxide film has been formed and it is left alone in an atmosphere at the reaction commencement temperature or above for the reaction to take place. In another method, solution obtained by dissolving a polyaniline derivative and a sulfonic acid compound is coated and then dried. In a further method, a polyaniline derivative is electrolytically polymerized. In a still further method, an oxidizer is introduced either per se or in the form of a solution in an adequate solvent into a porous body of the valve action metal with a surface oxide film, and the resulting composite is contacted with an aniline derivative monomer per se or in the form of a solution or gas. In a yet further method, an aniline derivative monomer is first introduced into a porous body of the valve action metal, and the resulting composite is contacted with an oxidizer.

The concentration of the dopant in polyaniline or derivative thereof according to the invention, may be controlled by any method. A convenient method of control is to dip polyaniline or derivative thereof in a sulfonic acid compound solution having a predetermined concentration or a predetermined pH for a predetermined period of time.

After the dopant concentration is made a predetermined concentration, the resulting composite is washed with an organic solvent such as methanol, followed by the necessary operation such as drying, whereby heat resistant polyaniline may be obtained.

To form a capacitor according to the invention, a polyaniline derivative is formed as a solid electrolyte on the valve action metal, and then the resulting composite is likewise dipped in a predetermined sulfonic acid compound solution and then washed with an organic solvent such as methanol, followed by the necessary operation such as drying. Afterwards, lead electrodes are provided in the usual way, thus completing the capacitor. It is possible to carry out the above polymerizing operation and subsequent assembling operations repeatedly.

According to the invention, the percentage of sulfonic acid groups per recurring unit of polyaniline or derivative thereof is 28 to 40%, i.e., a dopant concentration of the sulfonic acid compound as a dopant (i.e., percentage of dopant per recurring unit of polyaniline), is set to 28 to 40%, because in this range of the concentration of the dopant both the conductivity and the pyrolysis commencement temperature are excellent. If the concentration of the dopant is below 28%, the conductivity that is obtainable is insufficient. If the concentration is above 40%, on the other hand, the pyrolysis commencement temperature is extremely reduced.

In the above dopant concentration range, the capacitor according to the invention has low equivalent series resistance and satisfactory frequency characteristics. Besides, the solder-dipping process at 260° C. or above results in no substantial characteristic deterioration, and excellent reliability can be ensured.

According to the invention, the concentration of the sulfonic acid compound solution is set to 0.01 to 0.5 N. The reason for doing so is to obtain heat resistant polyaniline or a solid electrolytic capacitor in which the percentage of sulfonic acid groups per recurring unit of polyaniline derivative is adjusted to 28 to 40% by dipping the polyaniline derivative in the sulfonic acid compound solution set to 0.01 to 0.5 N.

With polyaniline or derivative thereof containing a sulfonic acid compound as a dopant according to the invention, heat resistant polyaniline or derivative thereof is obtainable because the percentage of sulfonic acid groups per recurring unit of polyaniline or derivative thereof is 28 to 40%. Further, as solid electrolyte of a solid electrolytic capacitor according to the invention, the above compound can meet the requirements for high conductivity, a dielectric healing function and heat resistance at 260° C. and above.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 2:
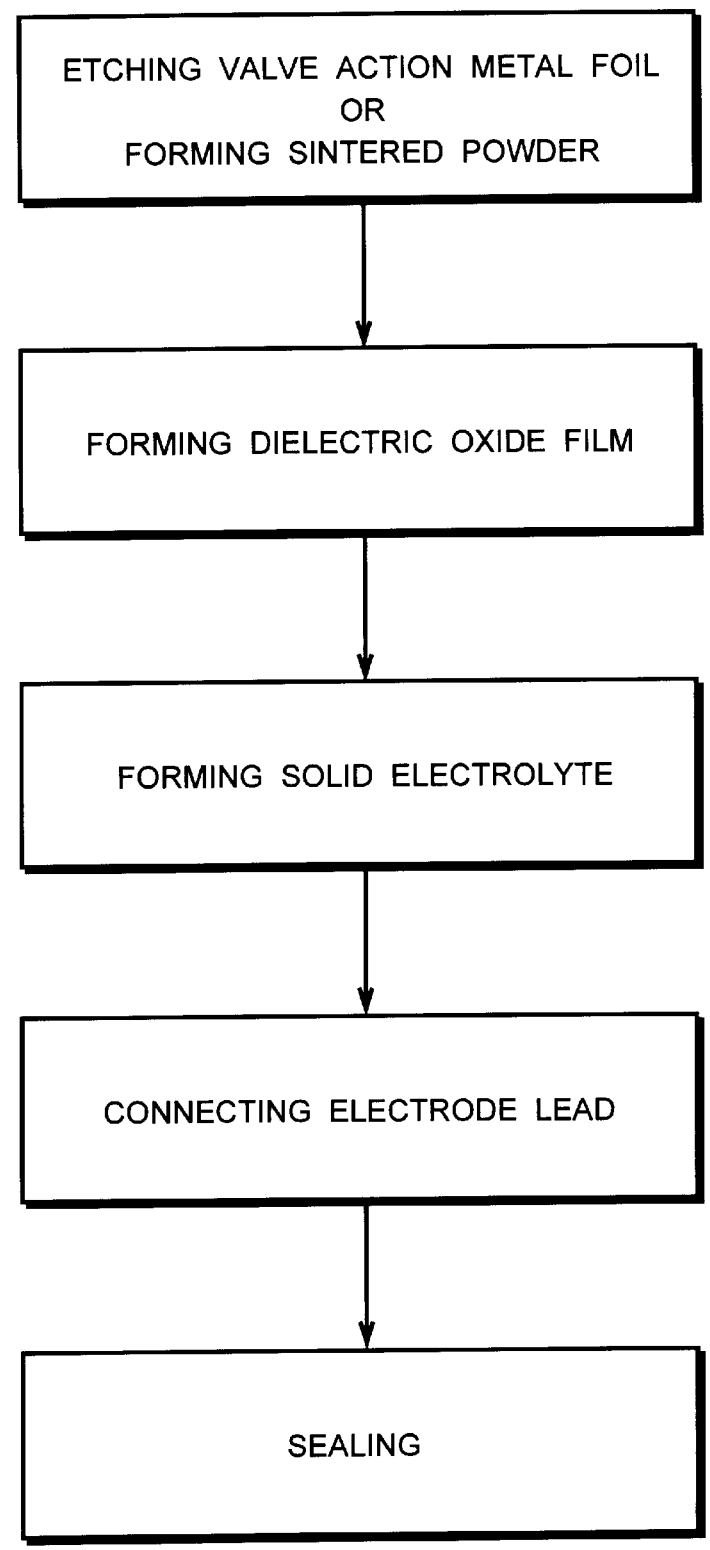
FIG. 2 is a flow chart for use in explaining a method of manufacturing a solid electrolytic capacitor according to the invention.

FIG. 2 illustrates an example of the method of manufacturing a solid electrolytic capacitor according to the invention.

When aluminum foil is used as the valve action metal, numerous surface micropores are formed in the aluminum foil through etching. When tantalum powder is used as the valve action metal, it is sintered by pressing. The valve action metal is then oxidized by anodic oxidization to form an oxide film as dielectric. Then, polyaniline is formed as solid electrolyte, and the dopant concentration in the electrolyte is then adjusted to a predetermined value. Afterwards, carbon paste and silver paste are coated and fixed, followed by lead connection and subsequent sealing to complete the product.

The dopant concentration was calculated from the S/N (Sulfur/Nitrogen) ratio of polyaniline as determined through elemental analysis.

The frequency characteristic of capacitor was determined by using "Impedance Analyzer 4194A" provided by Yokogawa Hewlett Packard Co. Ltd.

The thermal analysis was conducted using "TG-DTA2000" provided by Mack Science Co., Ltd. It was conducted in nitrogen atmosphere, with a temperature rise rate of 10° C./min., and in a temperature range of 25 to 700° C.

Embodiments of the invention will now be explained.

EMBODIMENT 1

Added to 60 ml of a solution containing 22 mmol of aniline and 22 mmol of p-toluenesulfonic acid was 20 ml of a solution containing 7 mmol of ammonium dichromate and 48 mmol of p-toluenesulfonic acid, and the resultant solution was stirred while being held at 0° C. for one hour. The solution was then filtered, then washed with water and ethanol, and then dried under reduced pressure. Black polyaniline was obtained as a result, which was then added to a 0.03 N p-toluenesulfonic acid solution, and the resultant solution was stirred at room temperature for 30 min.

From elemental analysis of this polyaniline, the dopant concentration was found to be 30.5%, and the conductivity was found to be 3.3 S/cm. From thermal analysis of this compound, the pyrolysis commencement temperature was found to be 315° C. (Table 1)

EMBODIMENT 2

Black polyaniline was obtained in the manner as in Embodiment 1. It was then added to a 0.03 N p-toluenesulfonic acid solution, and the resultant solution was stirred at room temperature for 60 minutes.

From elemental analysis of this polyaniline, the dopant concentration was found to be 34.7%, and the conductivity was found to be 8.1 S/cm. From thermal analysis of the compound, the pyrolysis commencement temperature was found to be 308° C. (Table 1)

EMBODIMENT 3

A sulfuric acid aqueous solution containing 0.1M of aniline was prepared. Using this solution, a polyaniline film was obtained through electrolytic polymerization by a 1 Hz scanning voltage process between −0.1 and 1.2 V (with respect to a saturated calomel electrode). The polyaniline film was then separated from the platinum electrode and washed by stirring it in pure water for about 60 minutes. This polyaniline was then held dipped in a 0.03 N p-toluenesulfonic acid solution at room temperature for 30 minutes.

From elemental analysis, the dopant concentration was found to be 36.5%, and the conductivity was found to be 9.3 S/cm. From thermal analysis of polyaniline, the pyrolysis commencement temperature was found to be 305° C. (Table 1)

EMBODIMENT 4

A p-toluenesulfonic acid aqueous solution containing 0.05M of aniline was prepared and, using this solution, a polyaniline film was prepared through electrolytic polymerization in the manner as in Embodiment 3. The polyaniline film was separated from platinum electrode and washed by stirring it in pure water for 60 minutes. This polyaniline was held dipped in a 0.04 N p-toluenesulfonic acid solution for 60 minutes. From elemental analysis, the dopant conductivity centration was found to be 40.7%, and the conductivity was found to be 10.3 S/cm. From thermal analysis of polyaniline, the pyrolysis commencement temperature was found to be 303° C. (Table 1)

COMPARISON EXAMPLE 1

Black polyaniline was obtained in the manner as in Embodiment 1. It was then stirred in a solution of water/ethanol=1/1 (volume ratio) at room temperature for 30 minutes.

From elemental analysis, the dopant concentration was found to be 22.5%, and the conductivity was found to be 0.18 S/cm. From thermal analysis of polyaniline, the pyrolysis commencement temperature was found to be 320° C. (Table 1)

COMPARISON EXAMPLE 2

Black polyaniline was obtained in the manner as in Embodiment 1. It was then stirred in a 0.05 p-toluenesulfonic acid solution at room temperature for 30 minutes.

From elemental analysis, the dopant concentration was found to be 42.5%, and the conductivity was found to be 10.6 S/cm. From thermal analysis of polyaniline, the pyrolysis commencement temperature was found to be 230° C. (Table 1)

COMPARISON EXAMPLE 3

Polyaniline was obtained through electrolytic polymerization in the manner as in Embodiment 3.

From elemental analysis, the dopant concentration was found to be 49.5%, and the conductivity was found to be 11.0 S/cm. From thermal analysis of polyaniline, the pyrolysis commencement temperature was found to be 225° C. (Table 1)

EMBODIMENT 5

Cylindrical pellets of sintered fine powder of tantalum with a diameter of 1.5 mm, a height of 2 mm, and a CV value (i.e., product of the capacity and formation voltage) of powder per gram of 30,000/g, were subjected to anodic oxidation in a 0.05 wt % nitric acid aqueous solution at 60 V, followed by washing and drying.

A solution prepared by adding 20 ml of a solution containing 7 mmol of ammonium dichromate and 48 mmol of p-toluenesulfonic acid to 60 ml of a solution 22 mmol of aniline and 22 mmol of p-toluenesulfonic acid was held at −3° C., and the tantalum pellets were dipped in this solution to be left at room temperature for 30 minutes. Black polyaniline was formed in this way.

The formation of polyaniline was made repeatedly five times. The resulting composite was then treated in a 0.03 N p-toluenesulfonic acid solution for 30 minutes and washed in an ethanol solution. Afterwards, a cathode lead was provided by using a silver paste, and the resulting composite was sealed with an epoxy resin. A capacitor was thus completed.

EMBODIMENT 6

A dielectric was formed on tantalum pellets in the manner as in Embodiment 5. These tantalum pellets were then held dipped in a 5 wt % aniline solution of water/ethanol=1/1 (volume ratio) containing equal mols of aniline and p-toluenesulfonic acid at room temperature for 30 seconds. Subsequently, the pellets were left for 30 minutes and then held dipped for 30 seconds in a 20 wt % oxidizer aqueous solution whose mol ratio of ammonium dichromate and p-toluenesulfonic acid was 1:3 at 0° C. The pellets were then taken out and left in air for 30 minutes for polymerization. The pellets were then washed with water and ethanol and then dried under reduced pressure. In this way, black polyaniline could be formed on the dielectric surface.

The above operations were repeated five times to form polyaniline to a sufficient thickness on the dielectric surface, and the pellets were then treated in a 0.04 N p-toluenesulfonic acid solution for 30 minutes.

Afterwards, provision of a lead with a silver paste were made in the manner as in Embodiment 5. A capacitor was thus completed.

COMPARISON EXAMPLE 4

Polyaniline was formed on capacitor dielectric surface in the manner as in Embodiment 5, followed by washing in a solution of water/ethanol=1/1 (volume ratio) for 30 minutes.

Afterwards, provision of a lead with a silver paste was made in the manner as in Embodiment 5. A capacitor was completed in this way.

COMPARISON EXAMPLE 5

Polyaniline was formed on a capacitor dielectric surface in the manner as in Embodiment 6. The resulting composite was then treated in a 0.05 N p-toluenesulfonic acid solution for 30 minutes.

Afterwards, provision of a lead with a silver paste was made in the manner as in Embodiment 6. A capacitor was completed in this way.

EMBODIMENT 7

A dielectric was formed on tantalum pellets in the manner as in Embodiment 5.

After the pellets were dipped in a sulfuric acid aqueous solution containing 0.1M of aniline, and a surface thereof was brought into contact with an auxiliary electrode, polyaniline was formed on the dielectric through electrolytic polymerization by a 1 Hz scanning voltage process between −0.1 and 1.2 V (with respect to a saturated calomel electrode).

The resulting composite was then washed by stirring it in pure water for 60 minutes, then treated in a 0.04 N p-toluenesulfonic acid solution for 60 minutes, and then washed in an ethanol solution. Then, a cathode lead is provided using a silver paste, and the tantalum pellet is then sealed with an epoxy resin. A capacitor was completed in this way.

EMBODIMENT 8

A dielectric was formed on tantalum pellets in the manner as in Embodiment 5.

After the tantalum pellets were dipped in a p-toluenesulfonic acid solution containing 0.05M of aniline, and a surface thereof was brought in contact with an auxiliary electrode, polyaniline was formed on the dielectric through electrolytic polymerization by a 1 Hz scanning voltage process between −0.1 and 1.2 V (with respect to a saturated calomel electrode). The polyaniline was then washed by stirring it in pure water for 60 minutes, then treated in a 0.03 N p-toluenesulfonic acid solution for 60 minutes, and then washing it in ethanol. Afterwards, a cathode lead was provided using a silver paste, and the tantalum pellet was sealed with an epoxy resin. A capacitor was completed in this way.

EMBODIMENT 9

Benzenedisulfonate was used as protonic acid in lieu of p-toluenesulfonic acid in Embodiment 5.

Afterwards, washing in ethanol and provision of a lead using a silver paste were made in the manner as in Embodiment 5. A capacitor was completed in this way.

EMBODIMENT 10

A hydrogen peroxide solution was used in lieu of ammonium dichromate in Embodiment 6. Afterwards, a capacitor was completed in the manner as in Embodiment 6.

EMBODIMENT 11

An aluminum foil which had a thickness of 150 $\mu$m and a size of 1×0.5 cm$^2$ and had its surface area increased by etching to 20 times, was subjected to anodic oxidation in a 5% ammonium boride aqueous solution at 100 V, followed by washing and drying. Afterwards, a capacitor was completed in the manner as in Embodiment 5.

TABLE 1

Table 1 shows the relationship of the dopant concentration (S/N) with the conductivity and with the pyrolysis commencement temperature:

|  | S/N | Conductivity (S/cm) | Pyrolysis Commencement Temperature (° C.) |
|---|---|---|---|
| Embodiment |  |  |  |
| 1 | 30.5 | 3.3 | 315 |
| 2 | 34.7 | 8.1 | 308 |
| 3 | 36.5 | 9.3 | 305 |
| 4 | 40.7 | 10.3 | 303 |
| Comparison Example |  |  |  |
| 1 | 22.5 | 0.18 | 320 |
| 2 | 42.5 | 10.6 | 230 |
| 3 | 49.5 | 11.0 | 225 |

TABLE 2

Table 2 shows the coverage factor (C/Co), the equivalent series resistance (ESRO) at 30 kHz, the equivalent series resistance (ESR) immediately after dripping in solder at 260° C. for ten seconds:

|  | C/CO (%) | EXRO (Ω) | ESR (Ω) | S/N |
|---|---|---|---|---|
| Embodiment 5 | 93 | 0.42 | 0.43 | 32.5 |
| Embodiment 6 | 92 | 0.30 | 0.35 | 40.7 |
| Comparison Example 4 | 91 | 2.3 | 2.2 | 23.1 |
| Comparison Example 5 | 93 | 0.28 | 3.5 | 65.5 |
| Embodiment 7 | 90 | 0.46 | 0.43 | 33.5 |
| Embodiment 8 | 90 | 0.48 | 0.45 | 39.5 |
| Embodiment 9 | 92 | 0.37 | 0.40 | 35.8 |
| Embodiment 10 | 91 | 0.45 | 0.43 | 31.5 |
| Embodiment 11 | 95 | 0.28 | 0.30 | 33.0 |

Table 1 lists the dopant concentration (S/N), conductivity (S/cm) and pyrolysis commencement temperature of polyaniline samples obtained in Embodiment 1 to 4 and Comparison Example 1 to 3.

As shown, polyaniline obtainable according to the invention has sufficient conductivity and heat resistance compared to the samples in the comparison examples. The polyaniline derivative has excellent properties and reliability only in the narrow dopant concentration range noted above. If the dopant concentration is below 28%, sufficient conductivity cannot be obtained. If the dopant concentration is above 40%, on the other hand, the pyrolysis commencement temperature is extremely reduced.

Figure 1:
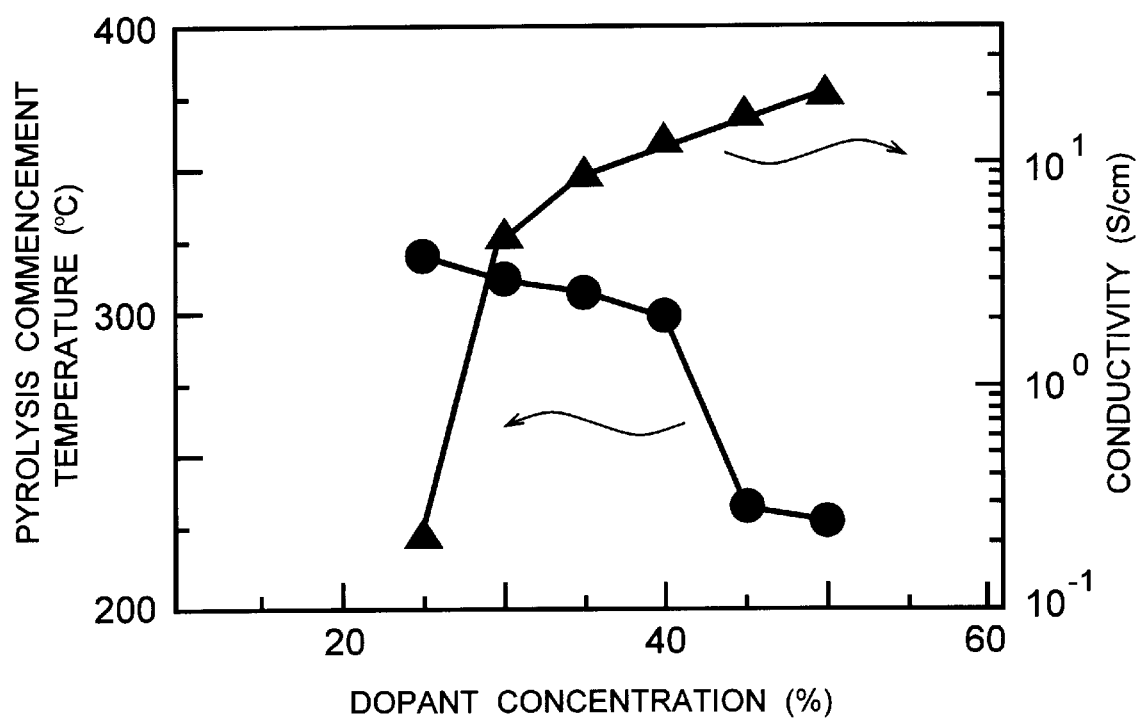
FIG. 1 is a graph showing a relationship of the dopant concentration with respect to the pyrolysis commencement temperature and conductivity of polyaniline.

These facts are obvious from the relationship of the pyrolysis commencement temperature with dopant concentration and with conductivity of polyaniline as shown in FIG. 1.

Table 2 shows the coverage factor (C/Co, Co being the capacitance in the electrolyte solution) and the equivalent series resistance (ESR) at 30 kHz of samples in Embodiment 5 to 11 and Comparison Examples 4 and 5 immediately after the capacitor manufacture and also after dipping in solder at 260° C. for 10 seconds. The table further shows the dopant concentration of the electrolyte polyaniline.

As shown, the capacitors obtainable according to the invention, compared to those in the comparison examples, have low equivalent series resistance and better frequency characteristics. Further, there is almost no deterioration in the properties in the process of dipping in solder at 260° C. for 10 seconds, thus showing excellent reliability.

As has been described in the foregoing, according to the invention it is possible to obtain heat resistant polyaniline or derivative thereof with the percentage of sulfonic acid groups per recurring unit of polyaniline or derivative thereof adjusted to 28 to 40% by dipping polyaniline or derivative thereof containing a sulfonic acid compound as a dopant in a 0.01 to 0.5M sulfonic acid compound solution. The polyaniline or derivative thereof thus obtained has excellent properties, i.e., a conductivity of 2 S/cm or above and a pyrolysis commencement temperature of 300° C. or above.

Moreover, the heat resistant polyaniline or derivative thereof permits a solid electrolytic capacitor to be obtained, which has sufficiently low ESR and satisfactory frequency characteristics and is subject to no substantial characteristic deterioration in the process of dipping in solder at 260° C., thus ensuring excellent reliability.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. Heat resistant conductive polymer containing nitrogen atoms, said atoms being contained exclusively in units of polyaniline or derivative thereof, said polyaniline or derivative thereof containing a sulfonic acid compound as a dopant, wherein the percentage of sulfonic acid groups per recurring unit of polyaniline or derivative thereof is 28 to 40%, as calculated from the sulfur to nitrogen ratio of said polyaniline or derivative thereof as determined by elemental analysis, and wherein the polyaniline or derivative thereof has a heat resistance of at least 260° C.

2. The heat resistant conductive polymer according to claim 1, wherein said sulfonic acid compound is an aromatic sulfonic acid.

3. The heat resistant conductive polymer according to claim 1, wherein said nitrogen atoms are contained in units of polyaniline or derivative thereof selected from the group consisting of polyaniline, poly(N-methylaniline), poly(2-methylaniline), poly(3-methylaniline), poly(2-nitroaniline) and poly(3-nitroaniline).

4. The heat resistant conductive polymer according to claim 3, wherein said sulfonic acid compound is p-toluenesulfonic acid.

5. The heat resistant conductive polymer according to claim 4, wherein said polyaniline or derivative thereof is polyaniline per se.

6. The heat resistant conductive polymer according to claim 5, wherein said heat resistant conductive polymer has a conductivity of at least 3.3 S/cm, and wherein the percentage of sulfonic acid groups per recurring unit of polyaniline is at least 30.5.

7. The heat resistant conductive polymer according to claim 1, wherein said heat resistant conductive polymer has a conductivity of at least 3.3 S/cm.

8. A solid electrolytic capacitor using a heat resistant conductive polymer containing nitrogen atoms, said atoms being contained exclusively in units of polyaniline or derivative thereof, said polyaniline or derivative thereof containing a sulfonic acid compound as a dopant, wherein the percentage of sulfonic acid groups per recurring unit of polyaniline or derivative thereof is 28 to 40%, as calculated from the sulfur to nitrogen ratio of said polyaniline or derivative thereof as determined by elemental analysis, and wherein the polyaniline or derivative thereof has a heat resistance of at least 260° C.

9. The solid electrolytic capacitor according to claim 8, wherein said sulfonic acid compound is an aromatic sulfonic acid.

10. The solid electrolytic capacitor according to claim 8, wherein said nitrogen atoms are contained in units of polyaniline or derivative thereof selected from the group consisting of polyaniline, poly(N-methylaniline), poly(2-methylaniline), poly(3-methylaniline), poly(2-nitroaniline) and poly(3-nitroaniline).

11. The solid electrolytic capacitor according to claim 10, wherein said sulfonic acid compound is p-toluenesulfonic acid.

12. The solid electrolytic capacitor according to claim 11, wherein said polyaniline or derivative thereof is polyaniline per se.

13. The solid electrolytic capacitor according to claim 12, wherein said heat resistant conductive polymer has a conductivity of at least 3.3 S/cm, and wherein the percentage of sulfonic acid groups per recurring unit of polyaniline is at least 30.5.

14. The solid electrolytic capacitor according to claim 8, wherein said heat resistant conductive polymer has a conductivity of at least 3.3 S/cm.

* * * * *

UNITED STATES PATENT AND TRADEMARK OFFICE
CERTIFICATE OF CORRECTION

PATENT : 5,959,832
DATED : September 28, 1999
INVENTOR(S): Atsushi KOBAYASHI et al.

It is certified that error appears in the above-identified patent and that said Letters Patent is hereby corrected as shown below:

On the title page:

Item No. [30], Foreign Priority Data, was omitted from the patent, please insert:

--Nov. 25, 1994 [JP] Japan..........................6-315575--.

Signed and Sealed this

Third Day of April, 2001

*Attest:*

NICHOLAS P. GODICI

*Attesting Officer*     *Acting Director of the United States Patent and Trademark Office*